(12) United States Patent
Van Ert et al.

(10) Patent No.: US 6,221,291 B1
(45) Date of Patent: *Apr. 24, 2001

(54) METHOD FOR MAKING A PREFORM

(75) Inventors: Jack M. Van Ert, Rochester Hills; Gregory A. LaPorte, New Hudson; John P. Slaven, Harper Woods; Xianping Liu, Rochester Hills; John F. Witt, Jr., Clinton Township, all of MI (US)

(73) Assignee: Lear Corporation, Southfield, MI (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/259,090

(22) Filed: Feb. 26, 1999

(51) Int. Cl.[7] .................................................... B29C 43/20
(52) U.S. Cl. ......................... 264/113; 264/112; 264/122; 264/911
(58) Field of Search ................................. 264/112, 113, 264/122, 911

(56) References Cited

U.S. PATENT DOCUMENTS

| 4,525,321 | 6/1985 | Tönniges ............................ 264/517 |
| 5,041,260 | 8/1991 | Johnson et al. ..................... 264/510 |
| 5,217,672 | 6/1993 | Kelman et al. ..................... 264/517 |
| 5,229,052 | 7/1993 | Billiu ................................. 264/115 |
| 5,503,788 | 4/1996 | Lazareck et al. ................... 264/115 |
| 5,575,965 | 11/1996 | Caronia et al. ................ 264/171.17 |
| 5,807,513 | 9/1998 | Gebreselassie ..................... 264/112 |
| 5,843,365 | 12/1998 | Pinson et al. ...................... 264/517 |

FOREIGN PATENT DOCUMENTS

| 42 15 349 A1 | 11/1993 | (DE) . |
| 0 443 051 A1 | 8/1991 | (EP) . |
| 0 566 830 A1 | 2/1992 | (EP) . |
| 0 638 404 A1 | 7/1993 | (EP) . |
| 5-111917 | * 5/1993 | (JP) . |
| 6-079836 | * 3/1994 | (JP) . |
| WO 98/30371 | 7/1998 | (WO) . |

OTHER PUBLICATIONS

English Abstract for EP 0 433 051 A1.
English Abstract for EP 0 566 830 A1.
English Abstract for DE 42 15 349 A1.

* cited by examiner

Primary Examiner—Mary Lynn Theisen
(74) Attorney, Agent, or Firm—Brooks & Kushman P.C.

(57) ABSTRACT

A method of forming a preform, for use in manufacturing a part having a predetermined part outline, includes positioning waste plastic material within an unconsolidated blank. The unconsolidated blank has an outline corresponding to a desired outline of the preform and the part outline. The method further includes selectively positioning reinforcing material within the unconsolidated blank for added strength. The unconsolidated blank is then heated and compressed to form the preform.

22 Claims, 5 Drawing Sheets

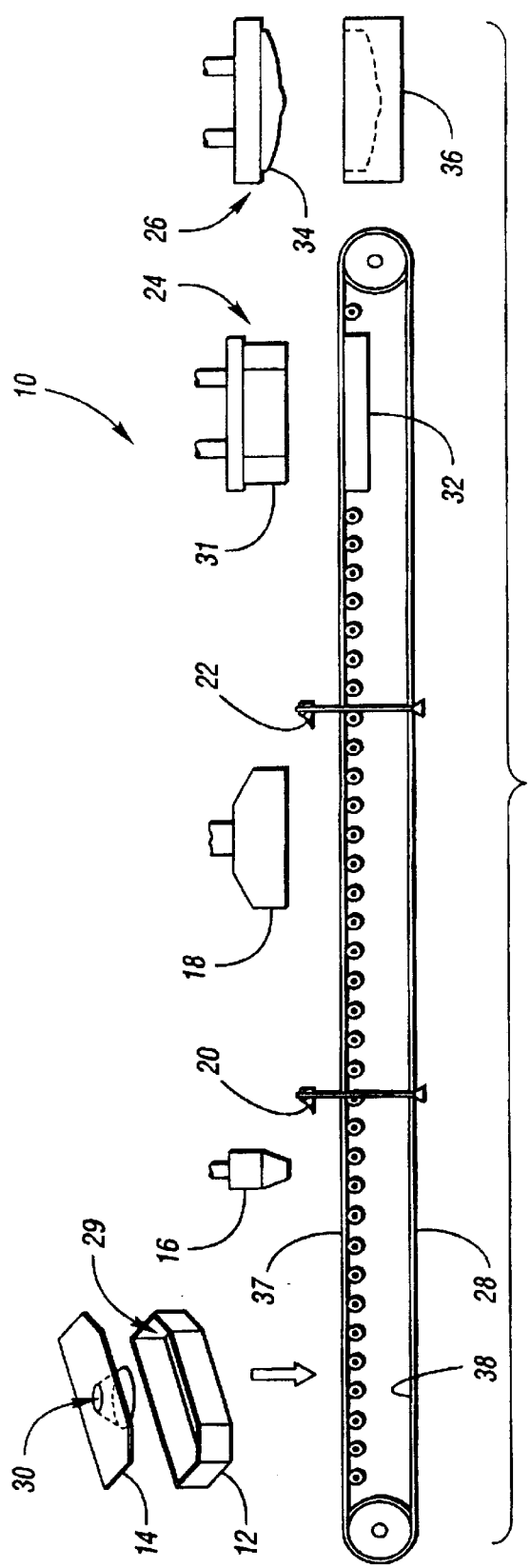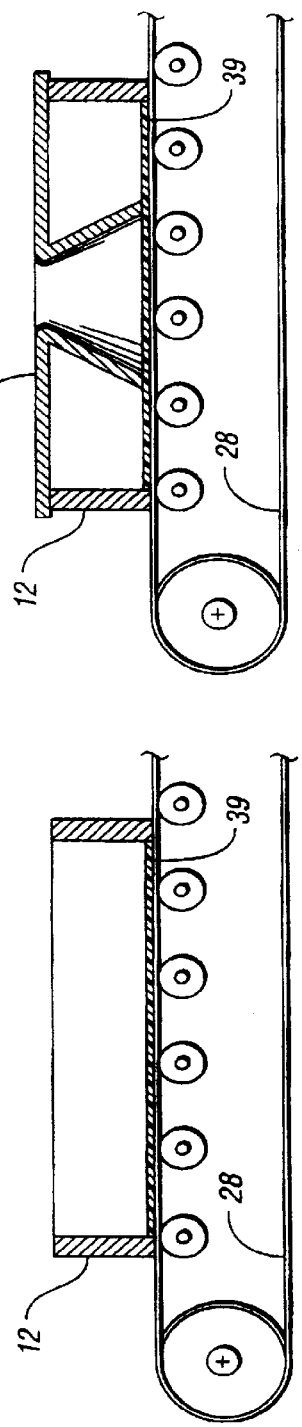

METHOD FOR MAKING A PREFORM

TECHNICAL FIELD

The invention relates to a method of forming a preform using waste plastic material.

BACKGROUND ART

A prior method of forming a plastic preform includes extruding virgin resin to form a flat plastic sheet, and die-cutting the plastic sheet to form the preform. Because the preform is made entirely of virgin resin, the preform is relatively costly to manufacture. Furthermore, because the plastic sheet is die-cut to obtain the desired shape of the preform, there is significant excess or scrap material associated with this method. The preform must also be heated prior to and/or during a subsequent molding operation.

Another method of forming a preform includes die-cutting layers of fibrous material from rectangular blanks or continuous rolls of material. The fibrous layers, which may include synthetic fibers and/or natural fibers impregnated with resin, are then heated and compressed together to form the preform. Because the fibrous layers are die-cut to obtain a desired shape, this method also involves significant excess or scrap material.

U.S. Pat. No. 5,807,513 discloses a method of recycling used trim components to form new trim panels for use in motor vehicles. The method includes shredding manufacturing scrap and post-consumer scrap into small particles to produce fluff. The fluff is then mixed with water and a binder reagent, and the mixture is placed in a sheet mold where it is formed into a pre-peg sheet. Finally, the pre-peg sheet is compression molded to form a finished trim panel. Similar to the above methods, however, the pre-peg sheets must typically be cut or otherwise trimmed prior to and/or after the compression molding step.

DISCLOSURE OF INVENTION

The present invention overcomes the shortcomings of the prior art by providing a method of forming a preform that involves positioning waste plastic material within an unconsolidated blank that has an outline corresponding to a desired outline of the preform. Consequently, this method reduces excess or scrap materials as compared with prior art methods. Furthermore, because the preform comprises waste plastic material, it is less costly to manufacture than preforms made only of virgin resin.

It is therefore an object of the invention to provide a method of forming a preform using waste plastic material. Such waste plastic material may include post consumer waste plastics, manufacturing operation wastes or post industrial waste plastics, plastics separated from automotive shredder residue, or any combination of these materials.

Under the invention, a method of forming a preform, for use in manufacturing a part having a part outline, includes positioning waste plastic material within an unconsolidated blank, the unconsolidated blank having an outline corresponding to a desired outline of the preform and the part outline; selectively positioning reinforcing material within the unconsolidated blank for added strength; heating the unconsolidated blank; and compressing the unconsolidated blank to form the preform.

According to one aspect of the invention, selectively positioning reinforcing material within the blank includes selectively depositing virgin resin at discrete locations within the blank. In this way, virgin resin can be selectively deposited in areas of the preform that require additional strength and/or that cannot tolerate inconsistencies in raw material.

According to another aspect of the invention, selectively positioning reinforcing material within the blank includes selectively positioning reinforcing fibers within the blank.

Under the invention, a method of forming a part having a part outline includes providing a frame that defines a first retaining region; positioning a form proximate the frame such that a portion of the form extends into the first retaining region, the portion of the form defining a second retaining region within the first retaining region; selectively depositing virgin resin within the second retaining region; removing the form from the first retaining region; depositing waste plastic material within the first retaining region with the virgin resin to form an unconsolidated blank; heating the blank; and compressing the blank.

Preferably, the step of compressing the blank comprises compressing the blank to form a consolidated preform. Furthermore, the first retaining region preferably has an outline corresponding to a desired outline of the preform and the part outline, so as to reduce scrap materials associated with forming the preform.

Additionally, under the invention, a method of forming a preform, for use in manufacturing a part having a part outline, includes positioning a first reinforcing layer proximate a first surface; selectively depositing waste plastic material on the first reinforcing layer so as to form a waste plastic material layer having an outline that corresponds to a desired outline of the preform and the part outline; positioning a second reinforcing layer on the waste plastic material layer; heating the reinforcing layers and the waste plastic material layer; and compressing the reinforcing layers and the waste plastic material layer.

These and other objects, features and advantages of the invention are readily apparent from the following detailed description of the invention when taken in conjunction with the accompanying drawings.

BRIEF DESCRIPTION OF DRAWINGS

FIG. 1 is a schematic view of an apparatus for practicing the method according to the invention of forming a preform, and molding the preform to form a part, the apparatus including a preform frame, a stream form, first and second material depositing devices, first and second leveling blades, a heated platen assembly, a mold, and a conveyor belt;

FIG. 2 is a schematic cross-sectional view of the frame positioned on the conveyor belt;

FIG. 3 is a schematic cross-sectional view of the form positioned on the frame;

BEST MODE FOR CARRYING OUT THE INVENTION

Figure 4:
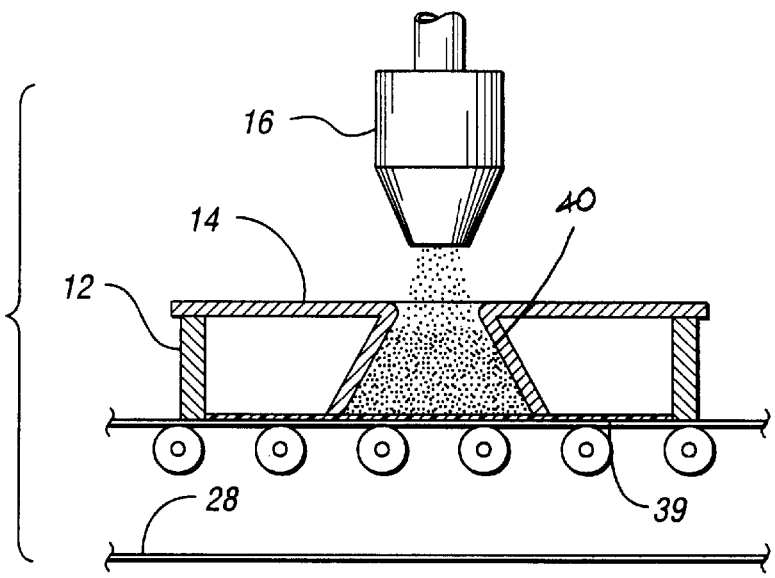
FIG. 4 is a schematic cross-sectional view of the form and frame positioned beneath the first material depositing device, and showing the first material depositing device depositing material into the form.

The present invention involves a method of molding parts utilizing scrap or waste plastic materials. Such waste plastic materials may include post consumer waste plastics, such as wastes collected from refuse sites and household wastes; manufacturing operation wastes or post industrial waste plastics; plastics separated from automotive shredder residue (ASR); or any combination of these materials. These waste plastic materials are commonly complex mixtures of many diverse waste materials, such as thermoplastic materials, cured thermosetting materials, paper, metals, fibrous materials, foams, glass, rubber, residue fluids and dirt. Preferably, these waste plastic materials comprise substantial amounts of thermoplastic materials and are available from such sources as KW Plastics of Bloomfield Hills, Mich. (post consumer waste plastics); Washington Penn Plastics Co., Inc. of Washington, Pa. (post consumer waste plastics and post industrial waste plastics); and Recovery Plastics International L.L.C. of Salt Lake City, Utah (plastics separated from ASR). All of the above types of waste plastic materials are collectively referred to hereinafter as waste plastic material.

The method according to the invention involves forming preforms, and compression molding the preforms to produce finished parts such as door panels, interior trim, package trays and seat backs for motor vehicles. FIG. 1 shows an apparatus 10 for practicing the method. The apparatus 10 preferably includes a preform frame 12, a stream form 14, first and second material depositing devices 16 and 18, respectively, one or more leveling devices such as first and second leveling blades 20 and 22, respectively, a heated consolidation cell or platen assembly 24, and a mold 26. The apparatus 10 further preferably includes a carrier, such as a conveyor belt 28, for transporting the frame 12 between the material depositing devices 16 and 18 and the platen assembly 24.

The frame 12 defines a first retaining region 29 for receiving and retaining unconsolidated material deposited therein, as well as for retaining the material during consolidation by the platen assembly 24. The first retaining region 29 preferably has an outline substantially similar to a desired outline of a preform to be formed with the frame 12. Furthermore, the outline of the first retaining region 29 is preferably substantially similar to a predetermined outline of a finished part to be formed with the preform. The form 14 is adapted to be mounted on the frame 12, and defines a second retaining region 30 for receiving and retaining material deposited therein. Alternatively, the form 14 may define multiple retaining regions. While the frame 12 and form 14 may be made of any suitable material, in a preferred embodiment they are made of TEFLON™ coated steel.

The first material depositing device 16 is preferably connected to a source (not shown) of virgin resin, such as polypropylene, and is configured to deposit the resin within the second retaining region 30 of the form 14. The resin may have any suitable configuration such as granules, beads, and/or pellets, and preferably functions as reinforcing material for strengthening the resultant preform. The first material depositing device 16 may also be connected to a source (not shown) of reinforcing fibers, such as sisal, flax, jute, kenaf, and/or glass. The second material depositing device 18 is connected to a source (not shown) of waste plastic material, and is configured to deposit the waste plastic material within the first retaining region 29 of the frame 12. The waste plastic material may have any suitable configuration such as granules, beads, pellets, flakes, shreds, fibers, and/or other types of particles, and the particles preferably have a length or diameter less than 0.25 inches. The second material depositing device 18 may also be connected to a source (not shown) of reinforcing fibers, such as sisal, flax, jute, kenaf, and/or glass. The first and second leveling blades 20 and 22 may be used to remove excess material from the form 14 and frame 12, respectively.

The heated platen assembly 24 includes a movable, first or upper platen 31, which is preferably insertable into the frame 12, and a second or lower platen 32, which may or may not be movable. Preferably both of the platens 31 and 32 are heated in any suitable manner to a sufficient temperature so as to soften the resin material and/or the waste plastic material.

The mold 26 includes first and second mold portions 34 and 36, respectively, for compressing and shaping material disposed therebetween. The mold portions 34 and 36 may be thermally regulated so as to heat and/or cool material disposed therebetween.

The conveyor belt 28 has first and second sides 37 and 38, respectively, and preferably comprises a non-stick material, such as TEFLON™, so that the firs side 37 is substantially non-sticking. Alternatively, the carrier may be configured as a substantially non-sticking film, such as a film comprising TEFLON™, or the carrier may have any suitable configuration sufficient to support material deposited within the frame 12. For example, the carrier may be a scrim layer, perforated sheet, mesh, platen surface, or mold surface.

FIGS. 2 through 13 show the molding cycle for forming a preform and compression molding the preform to form a finished part according to the invention. First, the frame 12 is placed on the conveyor belt 28, and a first or bottom layer 39 is positioned within the frame 12, as shown in FIG. 2. The bottom layer 39 preferably assists in supporting material deposited within the frame 12, and it may have any suitable configuration such as a plastic film or a scrim layer.

Furthermore, the bottom layer 39 may comprise reinforcing materials, such as natural and/or synthetic fibers, and may function as a reinforcing layer for strengthening the resultant preform and finished part. The bottom layer 39 may be a preformed layer that is cut or otherwise formed to a desired shape, or the bottom layer 39 may be formed by depositing materials within the frame 12. Alternatively, the bottom layer 39 may be eliminated if not required for a particular application. The form 14 is then positioned on the frame 12 as shown in FIG. 3.

Figure 5:
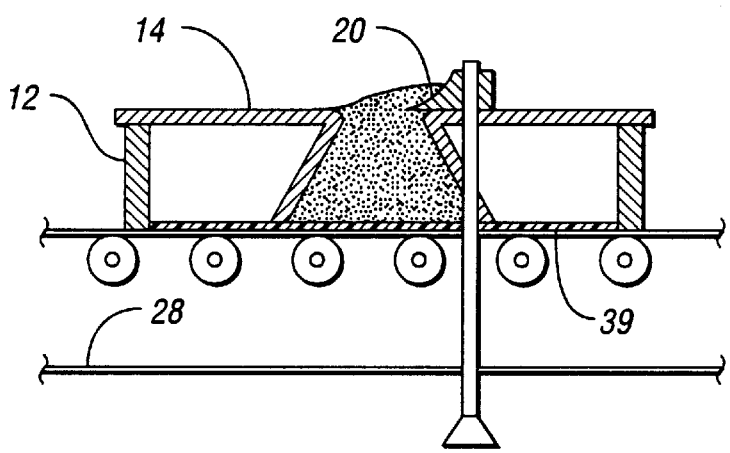
FIG. 5 is a schematic cross-sectional view of the form and frame positioned beneath the first leveling blade, and showing the first leveling blade removing excess material from the form.

Next, the frame 12 and form 14 are positioned beneath the first material depositing device 16 by the conveyor belt 28, and resin is selectively deposited within the form 14 by the first material depositing device 16, as shown in FIG. 4, to form a resin region 40. The first material depositing device 16 may also selectively deposit reinforcing fibers with the resin. Alternatively, reinforcing fibers may be deposited by a separate device or they may be selectively positioned within or adjacent to the resin region 40 in any suitable manner known in the art. For example, one or more fiber layers may be cut from a continuous roll of fibrous material, and the fiber layers may be positioned above, below and/or within the resin region 40. Referring to FIG. 5, the first leveling blade 20 may then be used to remove any excess resin and/or reinforcing fibers from the form 14. Advantageously, materials removed by the first leveling blade 20 may be reused in a subsequent molding cycle to form another preform. Alternatively, resin may be selectively deposited or otherwise positioned at one or more discrete locations without using a form.

Figure 6:
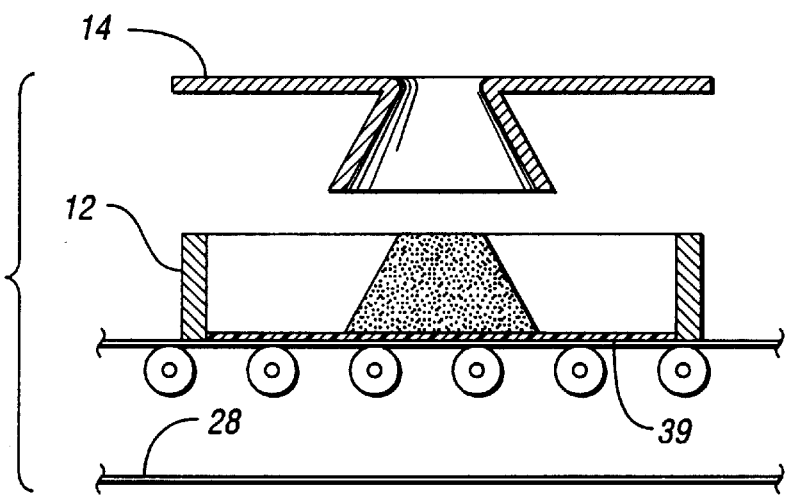
FIG. 6 is a schematic cross-sectional view of the form and frame, and showing the form removed from the frame.
Figure 7:
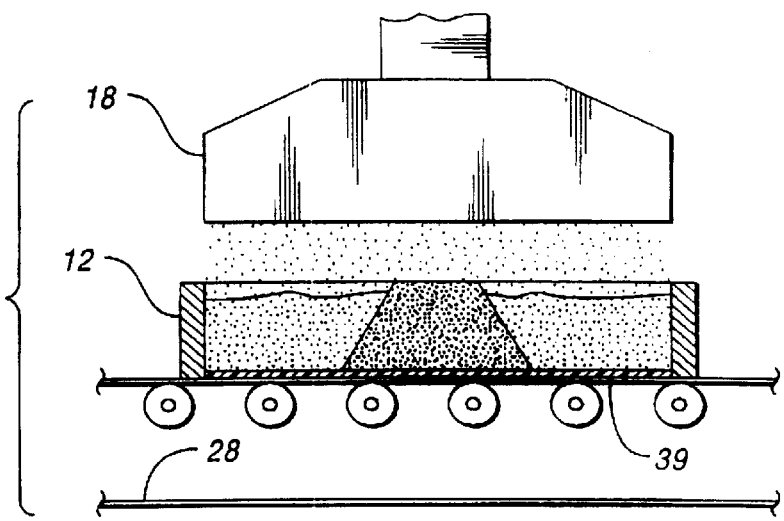
FIG. 7 is a schematic cross-sectional view of the frame positioned beneath the second material depositing device, and showing the second material depositing device depositing material into the frame.
Figure 8:
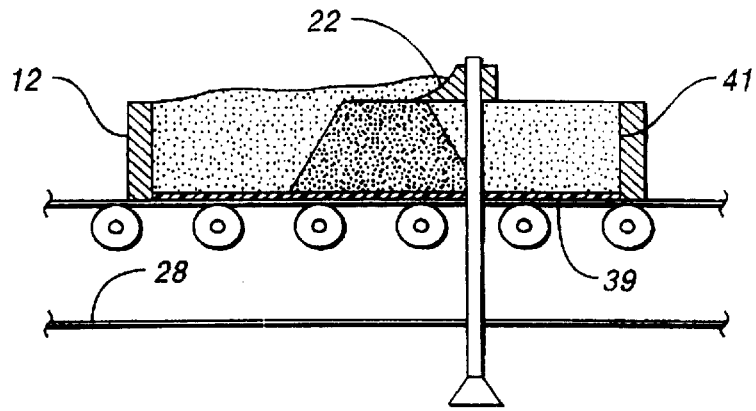
FIG. 8 is a schematic cross-sectional view of the frame positioned beneath the second leveling blade, and showing the second leveling blade removing excess material from the frame.

Next, the form 14 is removed from the frame 12 as shown in FIG. 6. Referring to FIG. 7, the frame 12 is then positioned beneath the second material depositing device 18 by the conveyor belt 28, and waste plastic material is selectively deposited within the frame 12 by the second material depositing device 18 to form a waste plastic material region 41. The second material depositing device 18 may also selectively deposit reinforcing fibers with the waste plastic material. Alternatively, reinforcing fibers may be deposited by a separate device or they may be selectively positioned within or adjacent to the waste plastic material region 41 in any suitable manner known in the art. For example, one or more fiber layers may be cut from a continuous roll of fibrous material, and the fiber layers may be positioned above, below and/or within the waste plastic material region 41. Next, the second leveling blade 22 may be used to remove any excess waste plastic material and/or reinforcing fibers from the frame 12, as shown in FIG. 8. Advantageously, materials removed by the second leveling blade 22 may be reused in a subsequent molding cycle to form another preform.

Figure 9:
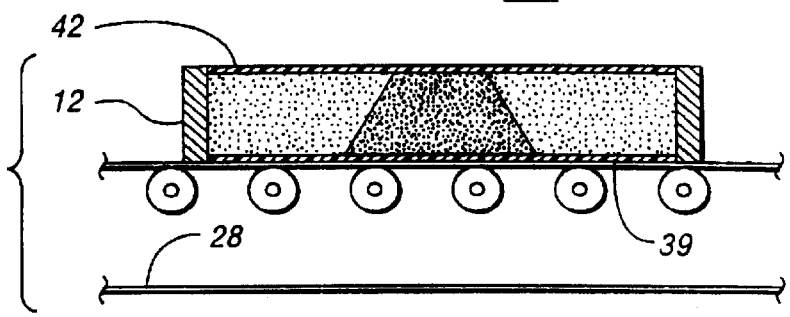
FIG. 9 is a schematic cross-sectional view of the frame showing a top layer positioned within the frame and over the material deposited by the first and second material depositing devices.

A second or top layer 42 is then placed within the frame 12 and over the resin and the waste plastic material, as shown in FIG. 9. The top layer 42 assists in retaining the resin and the waste plastic material within the frame 12, and it may have any suitable configuration such as a plastic film or a scrim layer. Furthermore, the top layer 42 may comprise reinforcing materials, such as natural and/or synthetic fibers, and may function as a reinforcing layer for strengthening the resultant preform and part. The top layer 42 may be a preformed layer that is cut or otherwise formed to a desired shape, or the top layer 42 may be formed by depositing materials within the frame 12. Alternatively, the top layer 42 may be eliminated if not required for a particular application. As another alternative, multiple layers may be positioned above and/or below the resin and/or the waste plastic material. As yet another alternative, the frame 12 may be eliminated from the process, and the waste plastic material and/or other materials may be selectively deposited or otherwise positioned on the conveyor belt 28 or other suitable surface, such as a platen or mold surface, so as to define a desired outline of a resultant preform, which outline is preferably substantially similar to a predetermined outline of a finished part that is made with the preform. Prior to the consolidation step described below, the materials deposited or otherwise positioned within the frame 12, or deposited or otherwise positioned on a suitable surface, are referred to as an unconsolidated blank.

Figure 10:
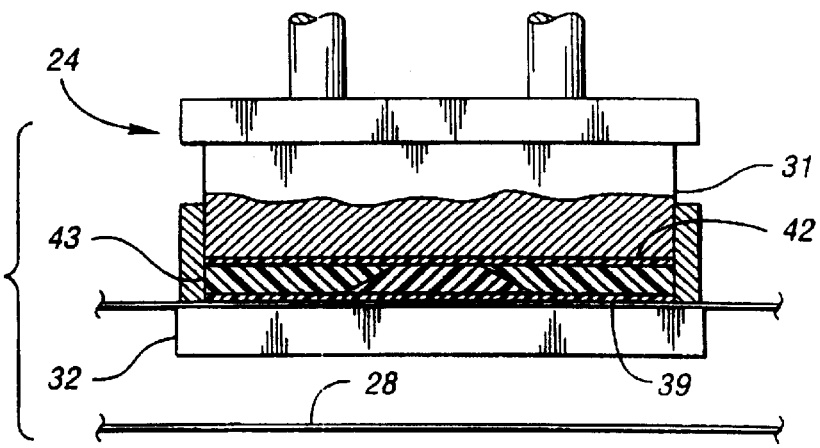
FIG. 10 is a schematic cross-sectional view of the frame positioned between first and second platens of the platen assembly, and showing the first and second platens compressing the materials within the frame so as to form a preform.

Referring to FIG. 10, the frame 12 is then positioned between the upper and lower platens 31 and 32, respectively, and the upper platen 31 is moved toward the lower platen 32 to heat and compress the resin, the waste plastic material, the reinforcing fibers, if used, and the top and bottom layers 39 and 42, if used. The resin and the waste plastic material are consolidated under heat and pressure, and are combined with the reinforcing fibers and the top and bottom layers 39 and 40 to form a consolidated blank or preform 43, which preferably has an outline that is substantially similar to a desired outline of the finished part. As shown in FIG. 10, the upper platen 31 is configured to nest within the frame 12. Alternatively, if the frame 12 is eliminated from the process, the upper platen 31 may have any suitable configuration sufficient to compress the resin, the waste plastic material and other materials against the lower platen 32.

Figure 11:
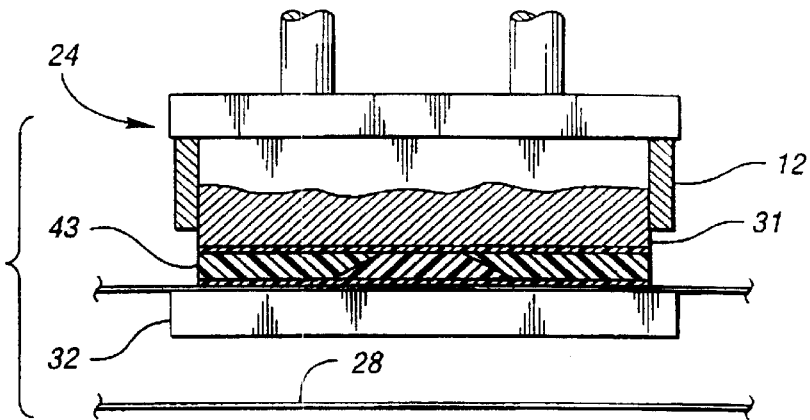
FIG. 11 is a schematic cross-sectional view of the frame, preform and platen assembly, and showing the frame removed from the preform.

The frame 12 is then raised, as shown in FIG. 11, and the preform 43 is released from the platen assembly 24. An air curtain may be used to assist in releasing the preform 43 from the platen assembly 24 as is known in the art. Alternatively, depending on the application, a preform may be formed without any selectively positioned virgin resin material. For example, a preform may be formed with a layer of waste plastic material sandwiched between two reinforcing layers that may comprise reinforcing materials such as natural fibers.

Figure 12:
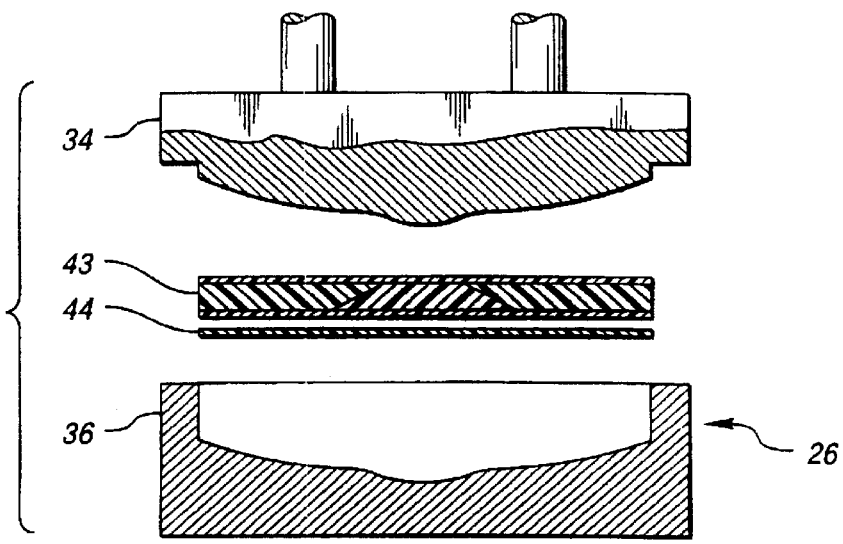
FIG. 12 is a schematic cross-sectional view of the preform and a cover material positioned between first and second mold portions of the mold.
Figure 13:
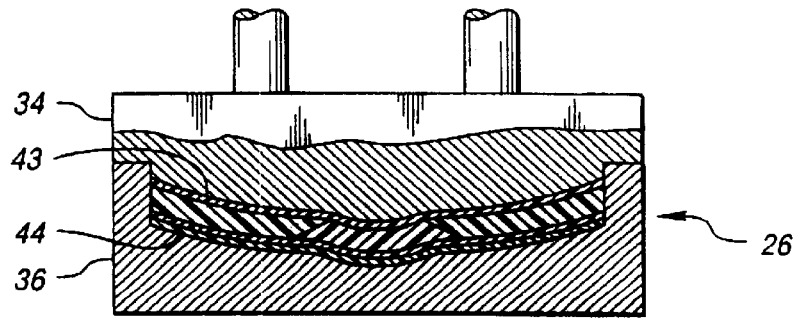
FIG. 13 is a schematic cross-sectional view of the mold with the first and second mold portions shown in a closed position.

Next, the preform 43 is positioned between the mold portions 34 and 36, as shown in FIG. 12. A cover material 44, comprising such materials as cloth, vinyl, thermoplastic polyolefin, and/or leather, may also be positioned between the mold portions 34 and 36. As shown in FIG. 13, the mold portions 34 and 36 are then moved toward each other to compress and shape the preform 43 and cover material 44, to thereby form a finished part having a predetermined outline. This step is known in the art as compression molding. Advantageously, the preform 43 may not require any additional heating prior to and/or during the compression molding step if the preform 43 is compression molded soon after the consolidation step. For relatively simple parts having a cover material that can withstand the heat and pressure developed during the consolidation step described above, or for parts provided without any cover materials, the consolidation step and the compression molding step may be performed simultaneously by either the platen assembly 24, the mold 26, or other suitable compression arrangement. Because the outline of the preform 43 is preferably substantially similar to the predetermined outline of the finished part, minimal, if any, cutting and/or trimming of the preform 43 is required. As a result, the method of the present invention results in less excess or scrap material as compared with prior methods of making preforms and finished parts from the preforms.

Figure 14:
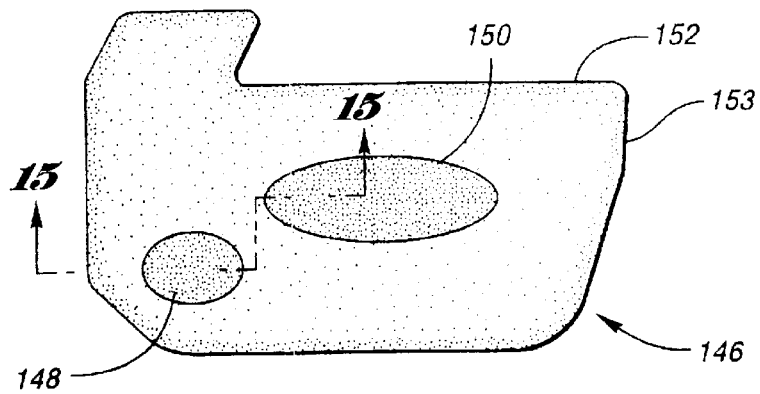
FIG. 14 is a front view of a door panel preform manufactured according to the present invention.
Figure 15:
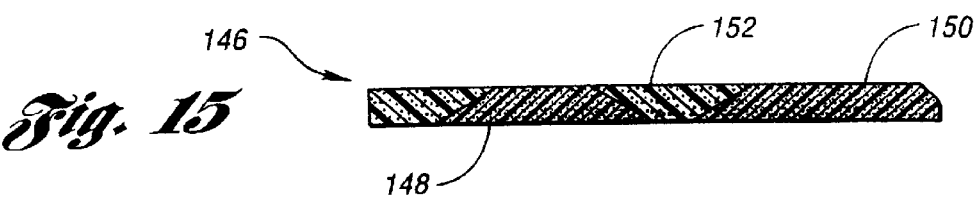
FIG. 15 is a cross-sectional view of the door panel preform taken along line 15—15 of FIG. 14.

FIGS. 14 and 15 show a door panel preform 146, manufactured according to the present invention, for use in manufacturing a finished door panel. The preform 146 has first and second regions 148 and 150, respectively, comprising selectively positioned virgin resin, and a third region 152 comprising selectively positioned waste plastic material. The first and second regions 148 and 150 correspond to areas that require relatively high performance characteristics, such as an armrest location and/or attachment points. By selectively positioning the virgin resin in the first and second regions 148 and 150, respectively, performance characteristics, such as strength and durability, in those regions can be maximized. Furthermore, by utilizing less costly waste plastic material in the remainder of the preform 146, overall cost of the preform 146 is reduced compared with preforms made entirely with virgin resin.

The preform 146 further has an outline 153 that is preferably substantially similar to a desired outline of the finished door panel. In a subsequent molding operation, one or more cover materials may be bonded to the preform 146, and the preform 146 may be shaped into the finished door panel. Because the outline 153 of the preform 146 is substantially similar to the desired outline of the finished door panel, minimal, if any, cutting and/or trimming of the preform 146 is required.

Figure 16:
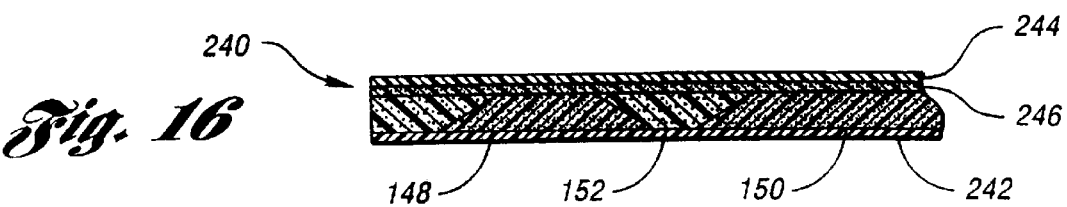
FIG. 16 is a cross-sectional view similar to FIG. 15 of a second embodiment of the door panel preform.

FIG. 16 shows a second embodiment 240 of the door panel preform manufactured according to the present invention. The preform 240 has first and second scrim layers 242 and 244, respectively, positioned above and below the first, second and third regions 148, 150 and 152, respectively, and a fiber layer 246. The scrim layers 242 and 244 provide additional strength to the preform 240, and may help inhibit warping of the preform 240 during and/or after a subsequent molding operation. While the scrim layers 242 and 244 may comprise any suitable material, the scrim layers 242 and 244 preferably comprise polyethylene terephthalate. The fiber layer 246 also provides additional strength to the preform 240, and preferably comprises natural fibers such as sisal, flax, kenaf, and/or jute.

Figure 17:
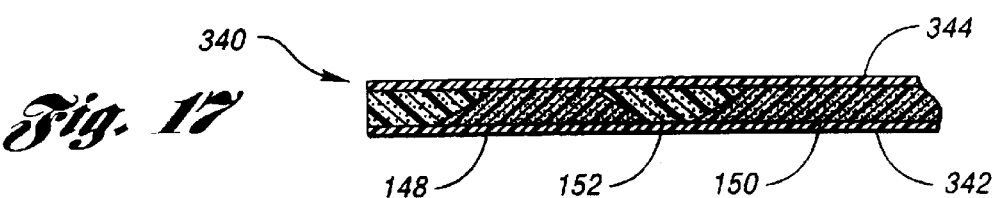
FIG. 17 is a cross-sectional view similar to FIG. 15 of a third embodiment of the door panel preform.

FIG. 17 shows a third embodiment 340 of the door panel preform manufactured according to the present invention. The preform 340 includes first and second plastic films 342 and 344, respectively, positioned above and below the first, second and third regions 148, 150 and 152, respectively. The plastic films 342 and 344 provide substantially homogeneous, relatively high quality plastic exterior surfaces on the preform 340. Furthermore, the plastic films 342 and 344 preferably function to trap impurities and/or odors that may be associated with the waste plastic material. While the plastic films 342 and 344 may comprise any suitable plastic material, the plastic films 342 and 344 preferably comprise polypropylene.

Figure 18:
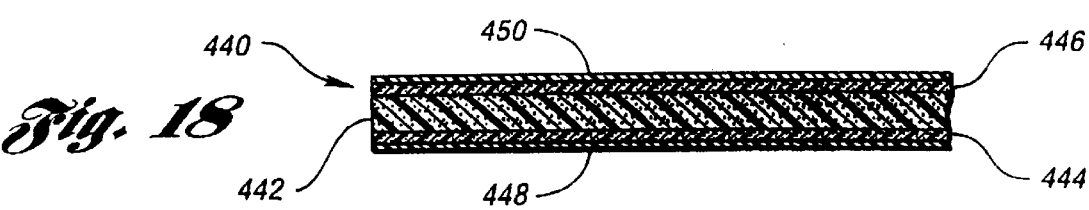
FIG. 18 is a cross-sectional view similar to FIG. 15 of a fourth embodiment of the door panel preform.

FIG. 18 shows a fourth embodiment 440 of the door panel preform manufactured according to the present invention. The preform 440 includes a middle layer 442 of waste plastic material, first and second fiber layers 444 and 446, respectively, and first and second plastic films 448 and 450, respectively. The fiber layers 444 and 446 provide sufficient strength to the preform 440 for a particular application such that no virgin resin material is necessary. Similar to the fiber layer 246 of the preform 240, the fiber layers 444 and 446 preferably comprise natural fibers such as sisal, flax, kenaf, and/or jute. The plastic films 448 and 450 are similar in function and composition to the plastic films 342 and 344 of the preform 340.

Another aspect of the present invention involves blow molding parts utilizing waste plastic material. Advantageously, waste plastic material and other reinforcing material, such as virgin resin, may be co-extruded to form a parison having at least one waste plastic material layer and at least one reinforcing material layer. The reinforcing material layer is used to provide the necessary melt strength to the parison so that it can be blow molded. Furthermore, the parison may be extruded with at least two reinforcing material layers that encapsulate the waste plastic material layer and are configured to trap odors and/or impurities that may be associated with the waste plastic material layer.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method of forming a preform for use in manufacturing a part having a predetermined part outline, the method comprising:

positioning waste plastic material within an unconsolidated blank, the unconsolidated blank having an outline corresponding to a desired outline of the preform and part outline;

selectively positioning reinforcing material within the unconsolidated blank for added strength;

heating the unconsolidated blank; and compressing the unconsolidated blank to form the preform.

2. The method of claim 1 wherein positioning waste plastic material comprises depositing plastics separated from automotive shredder residue within the unconsolidated blank.

3. The method of claim 1 wherein positioning waste plastic material comprises selectively depositing waste plastic material proximate a first surface so as to define the outline of the unconsolidated blank.

4. The method of claim 1 wherein positioning waste plastic material comprises depositing waste plastic material within a frame that defines the outline of the unconsolidated blank.

5. The method of claim 1 wherein selectively positioning reinforcing material comprises selectively positioning virgin resin at at least one discrete predetermined location within the unconsolidated blank.

6. The method of claim 5 wherein selectively positioning virgin resin comprises selectively depositing the virgin resin in a form that retains the resin.

7. The method of claim 1 wherein selectively positioning reinforcing material comprises selectively positioning natural fibers within the unconsolidated blank.

8. The method of claim 7 wherein selectively positioning natural fibers comprises selectively positioning the natural fibers in a discrete layer within the unconsolidated blank.

9. The method of claim 1 wherein selectively positioning reinforcing material comprises selectively positioning a scrim layer within the unconsolidated blank.

10. The method of claim 1 wherein selectively positioning reinforcing material comprises selectively positioning a plastic film within the unconsolidated blank.

11. The method of claim 1 wherein the heating and compressing steps are performed simultaneously.

12. A method of forming a part having a part outline, the method comprising:

providing a frame that defines a first retaining region;

positioning a form proximate the frame such that a portion of the form extends into the first retaining region, the portion of the form defining a second retaining region within the first retaining region;

selectively depositing virgin resin within the second retaining region;

removing the form from the first retaining region;

depositing waste plastic material within the first retaining region with the virgin resin to form an unconsolidated blank;

heating the blank; and compressing the blank.

13. The method of claim 12 further comprising positioning the frame proximate a carrier prior to selectively depositing virgin resin.

14. The method of claim 13 wherein the carrier is a film.

15. The method of claim 13 wherein the carrier is a scrim layer.

16. The method of claim 13 wherein the carrier is a conveyor belt.

17. The method of claim 12 further comprising depositing natural fibers within the first retaining region prior to the heating step such that the fibers form part of the unconsolidated blank.

18. The method of claim 12 further comprising positioning a scrim layer within the first retaining region prior to the heating step such that the scrim layer forms part of the unconsolidated blank.

19. The method of claim 12 further comprising positioning a plastic film within the first retaining region prior to the heating step such that the plastic film forms part of the unconsolidated blank.

20. The method of claim 12 wherein compressing the blank comprises compressing the blank to form a consolidated preform, and wherein the first retaining region has an outline corresponding to a desired outline of the preform and the part outline.

21. The method of claim 20 further comprising positioning the preform between two mold portions, and moving one mold portion toward the other mold portion to shape the preform, thereby forming the part.

22. A method of forming a preform for use in manufacturing a part having a predetermined part outline, the method comprising:

positioning a first reinforcing layer proximate a first surface;

selectively depositing waste plastic material on the first reinforcing layer so as to form a waste plastic material layer having an outline that corresponds to a desired outline of the preform and the part outline;

positioning a second reinforcing layer on the waste plastic material layer;

heating the reinforcing layers and the waste plastic material layer; and compressing the reinforcing layers and the waste plastic material layer.

* * * * *